(12) United States Patent
Suefuji

(10) Patent No.: US 8,970,091 B2
(45) Date of Patent: Mar. 3, 2015

(54) VIBRATION-TYPE DRIVING APPARATUS

(75) Inventor: Kei Suefuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/302,273

(22) Filed: Nov. 22, 2011

(65) Prior Publication Data

US 2012/0146460 A1 Jun. 14, 2012

(30) Foreign Application Priority Data

Dec. 9, 2010 (JP) .................. 2010-274285

(51) Int. Cl.
*H02N 2/16* (2006.01)

(52) U.S. Cl.
CPC ..................... *H02N 2/163* (2013.01)
USPC ................. 310/323.03; 310/323.08

(58) Field of Classification Search
CPC ................. H02N 2/00; H02N 2/163
USPC ........................ 310/323.01–323.21
See application file for complete search history.

(56) References Cited

U.S. PATENT DOCUMENTS

| | | | |
|---|---|---|---|
| 5,164,629 A | | 11/1992 | Nakanishi |
| 6,150,749 A | * | 11/2000 | Tamai et al. ............. 310/323.12 |
| 7,671,518 B2 | | 3/2010 | Sawada et al. |
| 2010/0033056 A1 | * | 2/2010 | Lim et al. ................. 310/323.11 |
| 2011/0273058 A1 | | 11/2011 | Suefuji et al. |

FOREIGN PATENT DOCUMENTS

| | | |
|---|---|---|
| JP | 62-247770 A | 10/1987 |
| JP | 3-253272 A | 11/1991 |
| JP | 2006-254683 A | 9/2006 |
| JP | 2010-263769 A | 11/2010 |

OTHER PUBLICATIONS

Office Action in Japanese Application No. 2010-274285, dated Aug. 19, 2014.

* cited by examiner

*Primary Examiner* — Derek Rosenau
(74) *Attorney, Agent, or Firm* — Fitzpatrick, Cella, Harper & Scinto

(57) ABSTRACT

A vibration-type driving apparatus includes a vibration member, to which an electrical-mechanical energy conversion element is fixed and which is vibrated when a driving voltage is applied to the electrical-mechanical energy conversion element; and a moving member that comes into contact with the vibration member and rotates relative to the vibration member in accordance with the vibration. The moving member includes a body portion and a contacting portion with a friction surface that comes into frictional contact with the vibration member and, in an area extending from a rotation axis in a radial direction, a line connecting a centroid of a shape of the moving member to an arbitrary point of the contacting portion of the moving member is parallel to a direction of the vibration trajectory of the vibration member.

10 Claims, 4 Drawing Sheets

DIRECTION OF VIBRATION TRAJECTORY
OF VIBRATION MEMBER

DIRECTION OF VIBRATION TRAJECTORY OF VIBRATION MEMBER

DIRECTION OF VIBRATION TRAJECTORY OF VIBRATION MEMBER

DIRECTION OF VIBRATION
TRAJECTORY OF VIBRATION MEMBER

VIBRATION-TYPE DRIVING APPARATUS

BACKGROUND OF THE INVENTION

1. Field of the Invention

The present invention relates to a vibration-type driving apparatus which is a so-called vibration wave motor causing a moving member to come into contact with a vibration member (vibrating member) in a pressurized state so as to perform a frictional driving action.

2. Description of the Related Art

In general, a vibration-type driving apparatus (vibration wave driving apparatus/a vibration wave motor) includes a vibration member that generates a traveling wave and a moving member that comes into contact with the vibration member in a pressurized state, where a driving force is obtained by frictionally driving the vibration member and the moving member using the traveling wave.

The related art of this kind of vibration-type driving apparatus is shown in FIG. 6A (for example, see U.S. Pat. No. 5,164,629).

In FIG. 6A, a vibration member 42 fixed to a housing 41 is formed in an annular shape, and a plurality of protrusions 42c are provided at the upper portion of an elastic body 42b throughout the entire circumference thereof.

Piezoelectric ceramics 42a are affixed to the bottom surface of the elastic body 42b by adhesive, and two alternating-current voltages with a phase difference are applied thereto from a driving circuit (not shown) when driving a motor, whereby a traveling wave is generated.

A moving member 43 includes an annular body portion 43a that is formed of an elastic member, a supporting portion 43b, and a contacting portion 43c that has a friction surface coming into frictional contact with the protrusions 42c of the vibration member 42.

The supporting portion 43b and the contacting portion 43c are both formed so as to have a thickness with a spring property, and are designed to stably come into contact with the vibration member 42.

A pressurizing spring 46 is attached to the top surface of the moving member 43 with a spring receiving member 44 and a rubber plate 45 interposed therebetween. The inner peripheral portion of the pressurizing spring 46 is attached to a disk 47 shrink-fitted to the output shaft 48, thereby transmitting the driving force of the moving member 43 to an output shaft 48.

The spring receiving member 44 includes a vibration damping rubber 44a and an annular weight member 44b. Accordingly, it is possible to prevent unnecessary vibration from being generated in the moving member 43 and prevents noise or reduction of efficiency.

However, as disclosed in the related art, even when unnecessary vibration is prevented by the vibration damping rubber 44a and the weight member 44b, the performance of the vibration-type driving apparatus may be degraded when the apparatus is driven for a long period of time.

Specifically, the contacting portion 43c of the moving member 43 comes into contact with the vibration member 42 as shown in FIG. 6B.

In FIG. 6B, when a traveling oscillating wave is generated in the vibration member 42, the top surface of the protrusion 42c of the vibration member 42 is vibrated in the direction indicated by the arrow of the drawing, and the top surface vibrates the moving member 43 through the contacting portion 43c. At this time, the direction of the excitation force generated from the vibration member 42 and received by the contacting portion 43c of the moving member does not pass through a centroid 43f of the moving member 43. Here, the centroid indicates the center of the figure, and the center of the figure indicates a coordinate point where the total sum of the geometrical moment of the area becomes 0.

For this reason, the excitation force generated from the vibration member 42 serves as a torsional moment with respect to the body portion 43a of the moving member 43. Due to the torsional moment, torsional vibration is generated in the body portion 43a so as to be alternately twisted about the vicinity of the centroid as shown in FIG. 6C.

Since the torsional vibration is generated as forced vibration which is forcedly excited by the driving frequency, noise such as so-called squealing sounds does not occur.

However, when the torsional vibration is superimposed with the traveling wave of the vibration member 42, the vibration amplitude of the composite vibration becomes uneven. For this reason, when the vibration-type driving apparatus is driven for a long period of time, the wear of the contacting portion 43c of the moving member 43 is unevenly promoted in the circumferential direction, which causes uneven wear.

When uneven wear occurs, there is concern in that the vibration member 42 and the moving member 43 may not be maintained to stably come into contact with each other, the performance of the vibration-type driving apparatus may be degraded, or squealing sounds may occur.

The invention is made in view of such circumstances, and it is an object of the invention to provide a vibration-type driving apparatus that suppresses unnecessary vibration generated with the driving of the vibration-type driving apparatus and reduces degradation of the performance even when the apparatus is driven for a long period of time.

SUMMARY OF THE INVENTION

The invention provides a vibration-type driving apparatus with the following configuration.

The vibration-type driving apparatus of the invention includes: a vibration member to which an electrical-mechanical energy conversion element is fixed and which is vibrated when a driving voltage is applied to the electrical-mechanical energy conversion element; and a moving member that comes into contact with the vibration member and rotates relative to the vibration member in accordance with the vibration, wherein the moving member includes a body portion and a contacting portion with a friction surface coming into frictional contact with the vibration member, and wherein a line connecting a centroid in a cross-sectional shape of the moving member determined from the rotation axis direction of the rotation and the radial direction to an arbitrary point of the contacting portion of the moving member is parallel to the direction of the vibration trajectory of the vibration member.

According to the invention, it is possible to realize a vibration-type driving apparatus that suppresses unnecessary vibration generated with the driving of the vibration-type driving apparatus and reduces degradation of the performance even when the apparatus is driven for a long period of time.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiments

First Embodiment

As a first exemplary embodiment, the configuration example of a vibration-type driving apparatus adopting the invention will be described by referring to FIG. 1.

Figure 1:
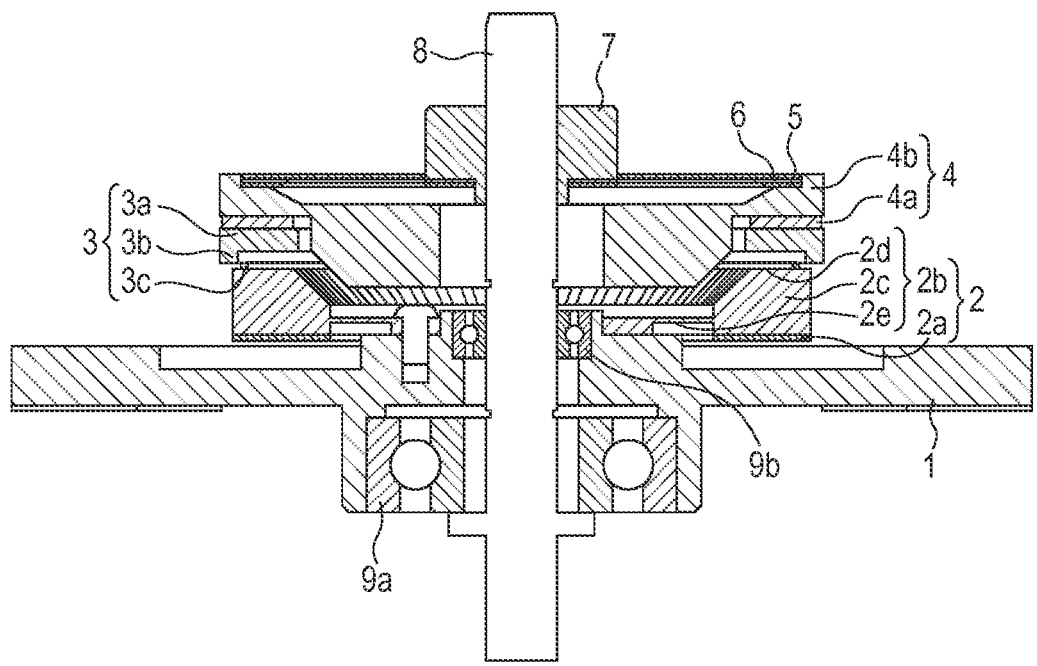
FIG. 1 is a cross-sectional view illustrating a configuration example of a vibration-type driving apparatus according to a first exemplary embodiment of the invention.

As shown in FIG. 1, the vibration-type driving apparatus of the exemplary embodiment is formed in an annular shape, and includes a vibration member 2 and a moving member 3 coming into frictional contact with the vibration member.

The vibration member 2 includes a piezoelectric element 2a that is formed as an electrical-mechanical energy conversion element converting an electric amount into a mechanical amount and an elastic body 2b that is coupled to the piezoelectric element 2a.

Then, a driving voltage (an alternating-current voltage (alternating voltage)) is applied to the piezoelectric element 2a, and elliptic motion occurs in the vibration member 2 by a traveling wave through an existing technology, so that the moving member 2 is rotated relative to the vibration member.

The elastic body 2b is formed as a metallic elastic member, and includes a base 2c, a protrusion 2d, and a flange 2e extending from the base 2c and fixing the elastic body 2b to the housing 1.

The protrusion 2d is disposed along the outer diameter side of the base 2c so as to have a concentric shape about the center axis of the elastic body 2b.

The surface of the protrusion 2d near the moving member 3 is formed as a contacting surface with respect to the moving member.

The moving member 3 includes an annular body portion 3a that is formed of an elastic member, a supporting portion 3b, and a contacting portion 3c that has a friction surface coming into frictional contact with the protrusion 2d of the vibration member 2.

A pressurizing spring 6 is attached to the top surface of the moving member 3 with a spring receiving member 4 and a rubber plate 5 interposed therebetween. The inner peripheral portion of the pressurizing spring 6 is attached to a disk 7 shrink-fitted to an output shaft 8, thereby transmitting the driving force of the moving member 3 to the output shaft 8.

The spring receiving member 4 includes a vibration damping rubber 4a and an annular weight member 4b, and suppresses unnecessary vibration from being generated in the moving member 3 and prevents noise or reduction of efficiency of the vibration-type driving apparatus.

The output shaft 8 is rotatably supported by a pair of rolling bearings 9a and 9b each of which includes an outer race fixed to the housing 1 and an inner race fitted to the outer periphery of the output shaft 8.

A precompression corresponding to a displacement amount of the pressurizing spring 6 pressurizing the moving member 3 to contact the vibration member 2 under an appropriate force is applied to the inner race of the rolling bearing 9a.

Accordingly, a radial deviation of the output shaft 8 may be suppressed while excluding looseness in the radial direction of the rolling bearing 9a.

Figure 2:
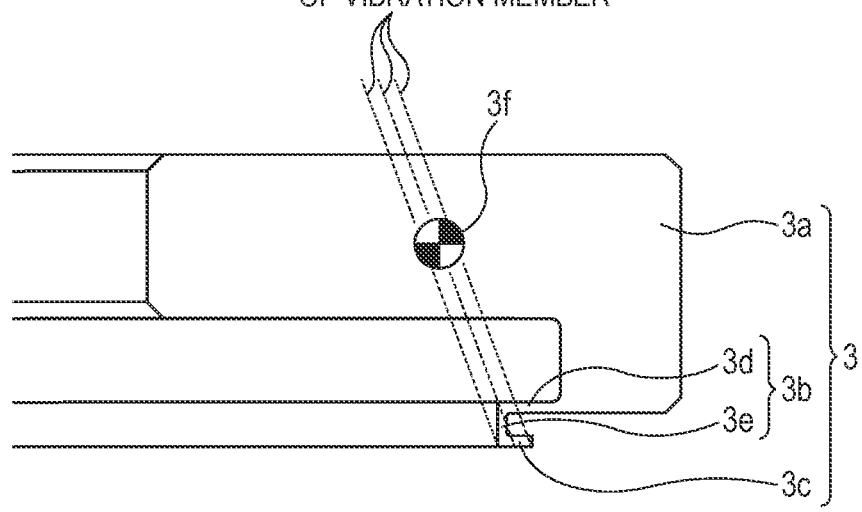
FIG. 2 is an enlarged cross-sectional view illustrating a part of a moving member in the vibration-type driving apparatus according to the first exemplary embodiment of the invention shown in FIG. 1.

FIG. 2 is an enlarged cross-sectional view illustrating a part of the moving member of the vibration-type driving apparatus shown in FIG. 1.

In FIG. 2, the supporting portion 3b includes a first supporting portion 3d and a second supporting portion 3e.

The first supporting portion 3d extends from the body portion 3a so as to be parallel to the contacting surface of the vibration member 2.

The second supporting portion 3e perpendicularly extends from the end of the first supporting portion 3d. The contacting portion 3c extends from the end of the second supporting portion 3e so as to be parallel to the contacting surface of the vibration member 2.

The supporting portion 3b and the contacting portion 3c are both formed so as to have a thickness with a spring property, and each of them has a cantilever cross-sectional structure. For this reason, each of the supporting portion 3b and the contacting portion 3c is elastically deformable in the rotation axis direction and the radial direction of the moving member 3. In the invention, the rotation axis indicates the axis serving as the rotation center when the moving member relatively rotates.

Further, the supporting portion 3b extends from the body portion 3a toward the inner diameter side, and the contacting portion 3c extends from the end of the supporting portion toward the outer diameter side.

Furthermore, the supporting portion 3b and the contacting portion 3c both have an even circumferential thickness so that the displacement of the friction surface of the contacting portion 3c in the rotation axis direction and the radial direction becomes even in a circumferential direction. In the invention, the radial direction indicates a direction which is perpendicular to the rotation axis direction.

Figure 3:
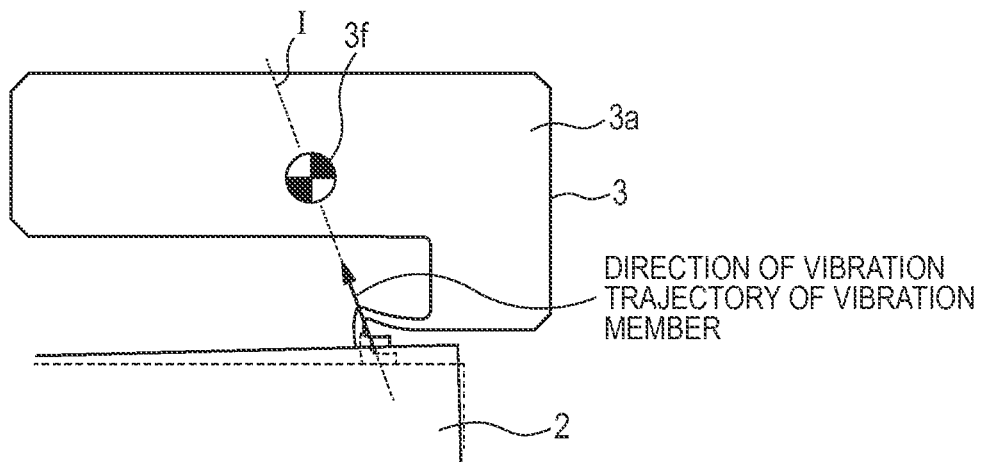
FIG. 3 is a diagram illustrating a contact shape between a vibration member and the moving member in the vibration-type driving apparatus according to the first exemplary embodiment of the invention shown in FIG. 1.

FIG. 3 illustrates a contact shape between the vibration member and the moving member in the vibration-type driving apparatus shown in FIG. 1.

In FIG. 3, the amplitude of the vibration generated in the vibration member 2 is set to be larger at the outer diameter side in relation to the inner diameter side.

The top surface of the protrusion 2d of the vibration member 2 vibrates in the direction indicated by the arrow of the drawing, and drives the moving member 3 with the contacting portion 3c interposed therebetween.

Each of the supporting portion 3b and the contacting portion 3c of the moving member 3 is elastically deformable, and as shown in FIG. 3, the displacement of the contacting portion 3c is set to be larger at the outer diameter side in relation to the inner diameter side. Accordingly, the slope of the contacting surface of the vibration member 2 and the slope of the friction surface of the contacting portion 3c repeatedly come into contact with each other while being maintained to be parallel to each other. For this reason, the entire friction surface of the contacting portion 3c may come into contact with the vibration member 2.

The body portion 3a of the moving member 3 extends toward the inner diameter side in relation to the contacting portion 3c, and has an even shape in the circumferential direction.

Furthermore, the body portion 3a is formed so that a line 1 is parallel to the direction of the vibration trajectory of the vibration member 2, where the line 1 connects a centroid 3f in the cross-sectional shape of the moving member 3 determined from the radial direction and the rotation axis direction of the moving member 3 to the point near the center portion of the contacting portion 3c. For this reason, the direction of the excitation force generated from the vibration member 2 and received by the moving member 3 through the contacting portion 3c passes through the centroid 3f of the moving member 3.

Accordingly, it is possible to reduce the magnitude of the torsional moment generated in the body portion 3a of the moving member 3 due to the excitation force generated from the vibration member 2.

For this reason, it is possible to suppress the torsional vibration of the body portion 3a generated with the driving vibration and considered as a problem in the structure of the related art.

Therefore, even when the vibration-type driving apparatus is driven for a long period of time, the contacting portion 3c of the moving member 3 is stably worn without any uneven wear in which uneven wear is promoted in the circumferential direction. Accordingly, it is possible to reduce degradation of the performance of the vibration-type driving apparatus even when the apparatus is driven for a long period of time.

Furthermore, in the exemplary embodiment, the body portion 3a is formed so that the line connecting the centroid 3f to the point near the center portion of the contacting portion 3c is parallel to the direction of the vibration trajectory of the vibration member 2 and the centroid 3f is positioned at the inner side in relation to the outermost peripheral portion of the contacting portion.

However, the invention is not limited to this configuration.

For example, even when the body portion 3a is provided so that the line connecting an arbitrary point from the outermost peripheral portion to the innermost peripheral portion of the contacting portion 3c to the centroid 3f is parallel to the direction of the vibration trajectory of the vibration member 2, the same effect is obtained since the torsional moment is reduced. In the invention, the case where "the line connecting the centroid 3f to the arbitrary point of the contacting portion 3c is parallel to direction of the vibration trajectory of the vibration member 2" includes not only the range where the line connecting the centroid 3f to the arbitrary point of the contacting portion 3c is completely parallel to the direction of the vibration trajectory of the vibration member 2 but also the range where the line is substantially parallel to the direction of the vibration trajectory. That is, in the angular range where the torsional vibration is not substantially generated, it is regarded that the line connecting the centroid 3f to the arbitrary point of the contacting portion 3c is "parallel" to the direction of the vibration trajectory of the vibration member 2.

Further, in the exemplary embodiment, the supporting portion 3b includes the first supporting portion 3d and the second supporting portion 3e, the first supporting portion 3d extends from the body portion 3a so as to be parallel to the contacting surface of the vibration member 2, and the second supporting portion 3e perpendicularly extends from the end of the first supporting portion 3d.

Further, the contacting portion 3c extends from the end of the second supporting portion 3e so as to be parallel to the contacting surface of the vibration member 2.

However, the invention is not limited to this configuration.

Figure 4:
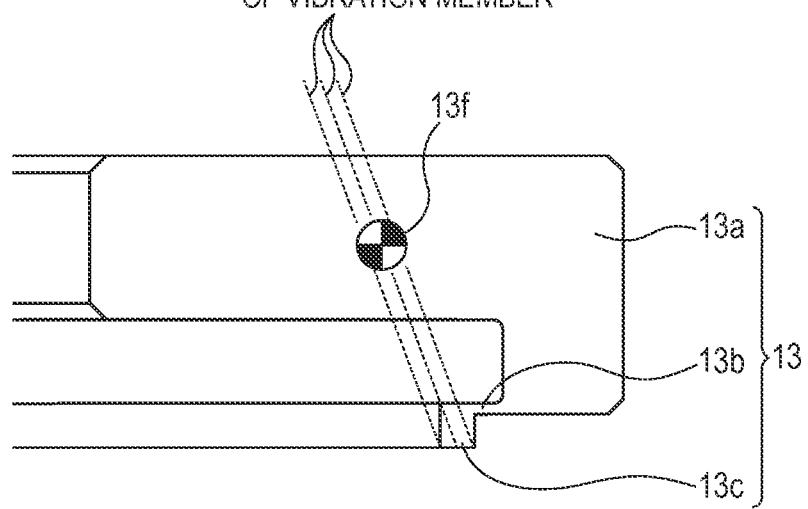
FIG. 4 is an enlarged cross-sectional view illustrating a part of a moving member of a first modified example of the vibration-type driving apparatus according to the first exemplary embodiment of the invention.

For example, as shown in FIG. 4, a supporting portion 13b may extend from a body portion 13a, and a contacting portion 13c may extend from the supporting portion 13b.

Even in the moving member 13, since the body portion 13a is provided so that a line connecting an arbitrary point from the outermost peripheral portion to the innermost peripheral portion of the contacting portion 13c to the centroid 13f is parallel to the direction of the vibration trajectory of the vibration member 2, the torsional moment may be reduced.

In particular, since the body portion 13a is provided so that the line connecting the outermost peripheral portion of the contacting portion 13c strongly pressed when contacting the vibration member 2 to the centroid 13f is parallel to the direction of the vibration trajectory of the vibration member 2, the torsional moment may be further reduced.

Accordingly, it is possible to reduce degradation of the performance of the vibration-type driving apparatus even when the apparatus is driven for a long period of time.

Second Embodiment

As a second exemplary embodiment, the configuration example of a vibration-type driving apparatus according to an exemplary embodiment different from the first exemplary embodiment will be described by referring to FIGS. 5A and 5B.

Figure 5A:
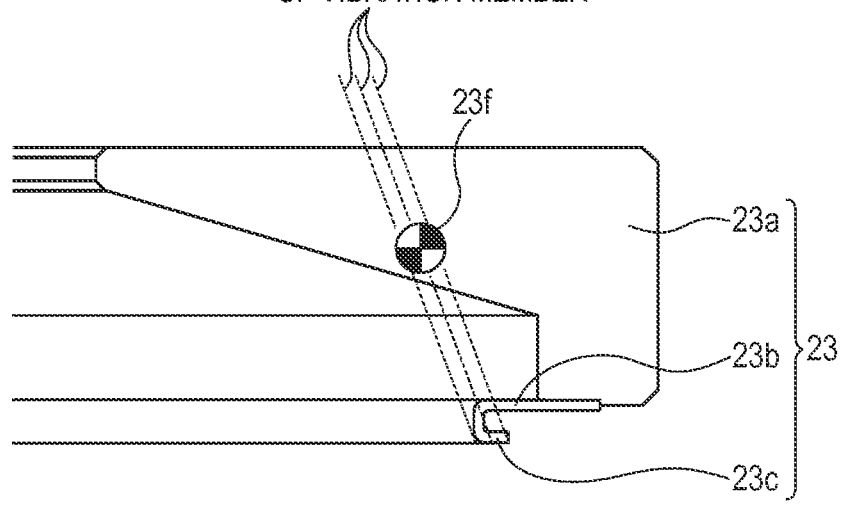
FIG. 5A is an enlarged cross-sectional view illustrating a part of a moving member in a vibration-type driving apparatus according to a second exemplary embodiment of the invention.

The vibration-type driving apparatus of the exemplary embodiment has a different configuration from the configuration of the first exemplary embodiment in that the supporting portion, the contacting portion, or the body portion of the moving member has a structure shown in FIG. 5A.

Since the other components of the exemplary embodiment (the vibration member, the output shaft, and the like) are the same as those of the first exemplary embodiment, the description thereof will not be repeated.

Furthermore, the configuration of the exemplary embodiment shown in FIG. 5A corresponds to those of FIGS. 2 and 4.

In FIG. 5A, a body portion 23a and a supporting portion 23b are formed as members separated from a moving member 23, and the supporting portion 23b and a contacting portion 23c are integrally formed with each other by sheet metal pressing.

The supporting portion 23b and the contacting portion 23c are both formed of a stainless steel sheet, and are subjected to quenching and tempering as a hardening treatment for improving durability.

Further, the supporting portion 23b and the contacting portion 23c are both formed so as to have a thickness with a spring property, and each of the supporting portion 23b and the contacting portion 23c is elastically deformable in the rotation axis direction and the radial direction of the moving member 23.

For this reason, the entire friction surface of the contacting portion 23c may come into contact with the vibration member 2.

The body portion 23a extends toward the inner diameter side in relation to the contacting portion 23c, and is formed in an annular shape.

The body portion 23a and the supporting portion 23b are bonded to each other by a method such as adhering using adhesive, metal soldering using solder, or welding using laser or electric resistance heat.

The body portion 23a is formed so that the line connecting a centroid 23f in the cross-sectional shape of the moving member 23 determined from the radial direction and the rotation axis direction of the moving member 23 to an arbitrary point of the contacting portion 23c is parallel to the direction of the vibration trajectory of the vibration member 2.

For this reason, the direction of the excitation force generated from the vibration member 2 and received by the moving member 23 through the contacting portion 23c passes through the centroid 23f of the moving member 23.

Accordingly, it is possible to reduce the magnitude of the torsional moment generated in the body portion 23a of the moving member 23 due to the excitation force generated from the vibration member 2.

Therefore, it is possible to suppress the torsional vibration of the body portion 23a from being generated during the driving operation, prevent uneven wear from being promoted, and reduce the degradation of the performance of the vibration-type driving apparatus when the apparatus is driven for a long period of time. Further, since the supporting portion 23b and the contacting portion 23c are integrally formed with each other by pressing and the body portion 23a is also formed by pressing, sintering, die-casting, or the like, it is possible to remarkably reduce costs or shorten manufacturing time compared to the cutting of the related art.

Furthermore, since the precision of the plate thickness of the material used in sheet metal pressing is extremely high, it is possible to reduce a variation in the rigidity of the supporting portion 23b and the contacting portion 23c and enable the reliable contact with the vibration member 2.

Figure 5B:
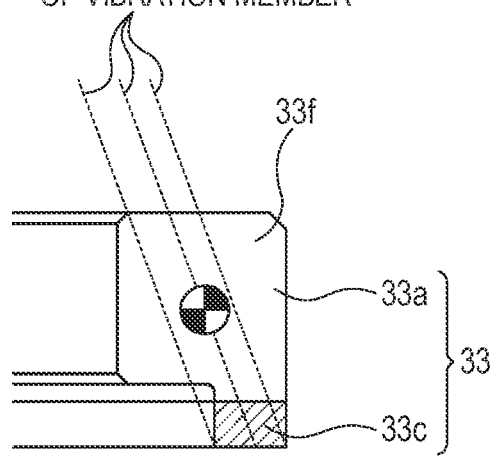
FIG. 5B is an enlarged cross-sectional view illustrating a part of a moving member of a modified example of the vibration-type driving apparatus according to the second exemplary embodiment of the invention.
Figure 6A:
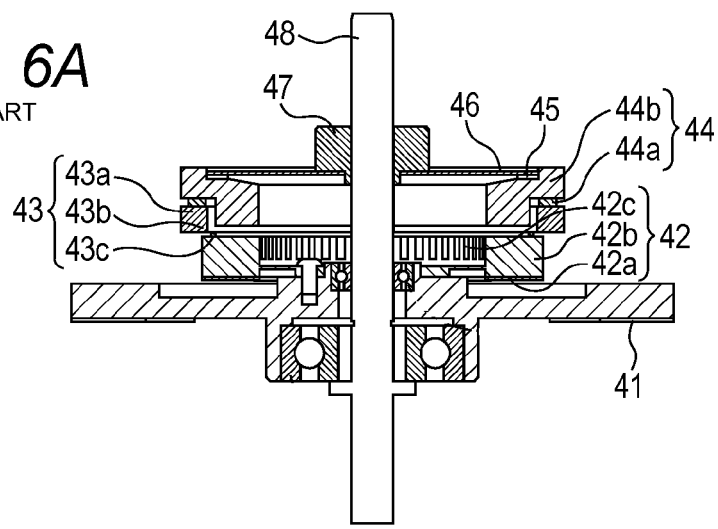
FIG. 6A is a cross-sectional view illustrating a configuration of a vibration-type driving apparatus of the related art.
Figure 6B:
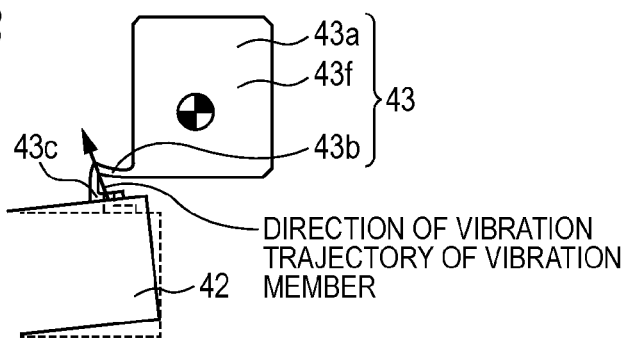
FIG. 6B is a diagram illustrating a contact shape between a vibration member and a moving member in the vibration-type driving apparatus of the related art.
Figure 6C:
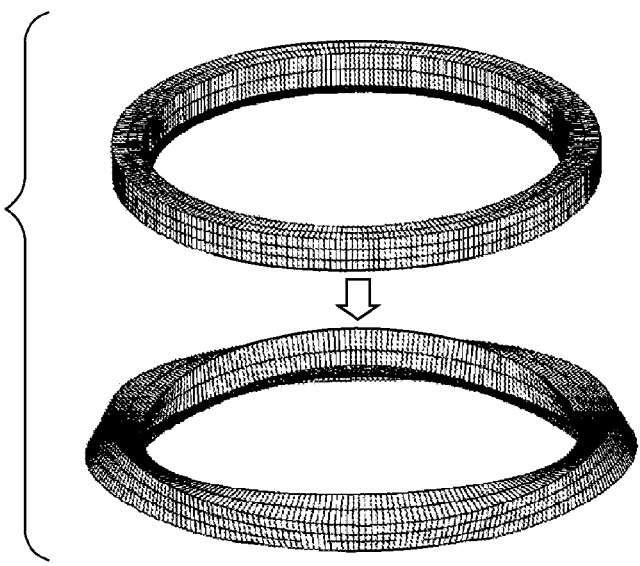
FIG. 6C is a diagram illustrating a shape of torsional vibration generated in the moving member in the vibration-type driving apparatus of the related art.

FIG. 5B is an enlarged cross-sectional view illustrating a part of the moving member of a modified example of the exemplary embodiment. FIG. 5B corresponds to FIGS. 2, 4, and 5A.

As shown in FIG. 5B, a body portion 33a and a contacting portion 33c of a moving member 33 are formed as separate members, and are bonded to each other by adhering using adhesive.

The contacting portion 33c is formed of a resin that mainly contains fluororesin powder (PTFE: polytetrafluoroethylene) and contains carbon fibers, polyimide, and molybdenum disulfide as additives and is formed by burning.

For this reason, the contacting portion 33c is elastically deformable when coming into contact with the vibration member 2, and stably comes into contact with the vibration member 2.

Furthermore, since the contacting portion 33c is formed as an annular flat plate, it is possible to facilitate processing work and reduce manufacturing cost or shorten manufacturing time compared to the case where the supporting portion and the contacting portion are integrally formed with each other.

The body portion 33a is formed so that the line connecting a centroid 33f in the cross-sectional shape of the moving member 33 determined from the radial direction and the rotation axis direction of the moving member 33 to an arbitrary point of the contacting portion 33c is parallel to the direction of the vibration trajectory of the vibration member 2.

For this reason, the direction of the excitation force generated from the vibration member 2 and received by the moving member 33 through the contacting portion 33c passes through the centroid 33f of the moving member 33.

Accordingly, it is possible to suppress the torsional vibration of the body portion 33a from being generated during the driving operation, prevent uneven wear from being promoted, and reduce the degradation of the performance of the vibration-type driving apparatus when the apparatus is driven for a long period of time.

Furthermore, in the exemplary embodiment, quenching and tempering are performed as a surface treatment for improving abrasion resistance, but the invention is not limited thereto. The friction surface of the contacting portion may be hardened by a nitriding treatment or thermal spraying.

As described above, according to the configurations of respective exemplary embodiments of the invention, it is possible to suppress unnecessary vibration from being generated with the driving of the vibration-type driving apparatus and reduce degradation in the performance even when the apparatus is driven for a long period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-274285, filed Dec. 9, 2010, hereby incorporated by reference herein in its entirety.

What is claimed is:

1. A vibration-type driving apparatus comprising:
a vibration member to which an electrical-mechanical energy conversion element is fixed and which is vibrated when a driving voltage is applied to the electrical-mechanical energy conversion element;
a moving member that comes into contact with the vibration member and rotates relative to the vibration member in accordance with the vibration, wherein the moving member includes a first portion and a second portion including a contacting portion with a friction surface that comes into frictional contact with the vibration member, the moving member being of an annular shape with an inner wall adjacent to a rotation axis and an outer wall at an outer periphery; and
an intermediate member in contact with the first portion and having an elasticity lower than that of the first portion,
wherein the intermediate member and the first portion are separate members,
wherein the second portion is elastically deformable, and
wherein, in a radial sectional area of the moving member extending from the inner wall to the outer wall, a line connecting a centroid of a shape of the radial sectional area of the moving member to a point of the contacting portion of the moving member is parallel to a direction of the vibration trajectory of the vibration member.

2. The vibration-type driving apparatus according to claim 1, wherein the moving member is configured such that the centroid of the shape of the radial sectional area to the moving member is positioned at an inner side in relation to an outermost peripheral portion of the contacting portion of the moving member.

3. The vibration-type driving apparatus according to claim 1, wherein the first portion is formed as a member separated from the second portion, and is bonded to the second portion.

4. The vibration-type driving apparatus according to claim 1, wherein the moving member includes a supporting portion that extends from the first portion and the contacting portion extends from the supporting portion.

5. The vibration-type driving apparatus according to claim 4, wherein the supporting portion includes a first supporting portion that extends from the first portion and a second supporting portion that extends from an end of the first supporting portion.

6. The vibration-type driving apparatus according to claim 4, wherein the first portion is formed as a member separate from the supporting portion and the contacting portion, and is bonded to the supporting portion.

7. The vibration-type driving apparatus according to claim 4, wherein the supporting portion and the contacting portion are formed by pressing.

8. The vibration-type driving apparatus according to claim 1, wherein the shape of the radial sectional area of the moving member is substantially the same in every radial direction.

9. The vibration-type driving apparatus according to claim 1, wherein the intermediate member having the elasticity lower than that of the first portion comprises rubber.

10. The vibration-type driving apparatus according to claim 1, further comprising a pressurizing spring attached to the first portion with the intermediate member having the elasticity lower than that of the first portion interposed therebetween.

* * * * *